United States Patent [19]

Fang

[11] Patent Number: 4,689,763
[45] Date of Patent: Aug. 25, 1987

[54] CMOS FULL ADDER CIRCUIT

[75] Inventor: Sheng Fang, San Antonio, Tex.

[73] Assignee: Advanced Micro Devices, Inc., Sunnyvale, Calif.

[21] Appl. No.: 688,782

[22] Filed: Jan. 4, 1985

[51] Int. Cl.$^4$ .............................................. G06F 7/50
[52] U.S. Cl. ................................................... 364/784
[58] Field of Search ......................... 364/784, 785, 786

[56] References Cited

U.S. PATENT DOCUMENTS

| 4,215,418 | 7/1980 | Muramatsu | 364/784 |
| 4,471,454 | 9/1984 | Dearden et al. | 364/786 |
| 4,583,192 | 4/1986 | Cieslak | 364/784 |
| 4,601,007 | 7/1986 | Uya et al. | 364/784 |
| 4,621,338 | 11/1986 | Uhlenhoff | 364/784 |

Primary Examiner—David H. Malzahn
Attorney, Agent, or Firm—Patrick T. King; Davis Chin; J. Vincent Tortolano

[57] ABSTRACT

A full adder circuit includes a sum circuit section, a carry-out circuit section, a carry-in circuit section; and an output circuit section. The sum circuit section includes a plurality of N-channel type MOS transistors having their gates adapted to receive true and complement binary addend signals of an ith order. The sum circuit section also includes a plurality of N-channel type MOS transistors having their gates adapted to receive true and complement binary augend signals of an ith order. The carry-out circuit section includes a plurality of N-channel type MOS transistors having their gates adapted to receive true and complement binary addend signals of an ith order. The carry-out circuit section also includes a plurality of N-channel MOS transistors having their gates adapted to receive true and complement binary augend signals of an ith order. The carry-in circuit section is formed of a plurality of N-channel type MOS transistors having their gates adapted to receive true and complement carry-in signals of an ith-1 order. The output circuit section includes a first pair of cross-coupled P-channel type MOS transistors connected to the sum circuit section and having their drains connected to respective true and complement sum output terminals. The output circuit section further includes a second pair of cross-coupled P-channel type MOS transistors connected to the carry-out circuit section and having their drains connected to respective true and complement carry-out terminals. All of the transistors are arranged on an integrated circuit substrate with topological regularity.

14 Claims, 3 Drawing Figures

CMOS FULL ADDER CIRCUIT

BACKGROUND OF THE INVENTION

This invention relates generally to arithmetic circuitry and more particularly, it relates to a complementary metal-oxide-semiconductor (CMOS) full adder circuit.

Heretofore, implementation of conventional CMOS full adder circuits have occupied a considerable amount of space area on the integrated circuit substrate. This problem is created by the high number of individual transistor elements and their lead interconnection space required in fabricating the adder circuits. Thus, these prior art adder circuits suffer from the disadvantages of slow speed of operation, high input capacitance and high manufacturing costs.

It would therefore be desirable to provide a CMOS full adder circuit which possesses an improved architecture and topological regularity of individual transistor elements so as to increase their circuit density and reduce their input capacitance when fabricated on an integrated circuit semiconductor chip. The full adder of the present invention is embodied in balanced CMOS devices which have a significantly reduced number of individual transistor elements over the conventional CMOS design, thereby permitting a reduced propagation delay and lower input capacitance.

SUMMARY OF THE INVENTION

Accordingly, it is a general object of the present invention to provide a new and improved CMOS full adder circuit.

It is an object of the present invention to provide a CMOS full adder circuit which has a reduced input capacitance and a lower propagation delay.

It is another object of the present invention to provide a CMOS full adder circuit which is formed with a significantly reduced number of individual transistor elements.

It is still another object of the present invention to provide a balanced CMOS full adder circuit formed of a plurality of individual MOS transistors which are arranged on an integrated circuit substrate with topological regularity.

It is yet still another object of the present invention to provide a CMOS full adder circuit in which true and complement outputs representative of sum and carry output signals are generated essentially at the same time.

In accordance with these aims and objectives, the present invention is concerned with the provision of a balanced CMOS full adder circuit which includes a sum circuit section, a carry output circuit section, a carry input circuit section and an output circuit section. The sum circuit section includes a plurality of N-channel MOS transistors having their gates adapted to receive true and complement binary addend signals. The sum circuit section also includes a plurality of N-channel MOS transistors having their gates adapted to receive true and complement augend signals. The carry output circuit section includes a plurality of N-channel MOS transistors having their gates adapted to receive true complement binary addend signals. The carry output circuit section also includes a plurality of N-channel MOS transistors having their gates adapted to receive true and complement binary augend signals. The carry input circuit section is formed of a plurality of N-channel MOS transistors having their gates adapted to receive true and complement binary carry input signals. The output circuit section includes a first pair of cross-coupled P-channel MOS transistors connected to the sum circuit section and having their drains connected to respective true and complement sum output terminals. The output circuit section also includes a second pair of cross-coupled P-channel MOS transistors connected to the carry output circuit section and having their drains connected to respective true and complement carry output output terminals.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 3:
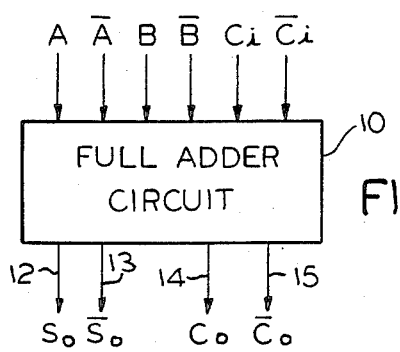
FIG. 3 is a block diagram representation of the full adder circuit of FIG. 1 or FIG. 2.

Referring now in detail to the various views of the drawings, there is shown in FIG. 3 in block diagram form a full adder 10 of the present invention which receives six input signals A, $\bar{A}$, B, $\bar{B}$, Ci, $\overline{Ci}$ and generates four output signals So, $\overline{So}$, Co and $\overline{Co}$. The input signal A and its associated inverse $\bar{A}$ represent an addend input binary bit. The input signal B and its inverse $\bar{B}$ represent an augend input binary bit. The input signal Ci and its inverse $\overline{Ci}$ represent carry input signals. The output signal So represent a sum output, and the output signal $\overline{So}$ represent the complement of the sum output So. The output signal Co represent a carry output signal. The output signal $\overline{Co}$ represent the complement of the carry output Co.

As is well known to those skilled in the art, the sum output So on line 12 of the full adder obey the following Boolean logical equation:

$$So = A \oplus B \oplus Ci$$

Where the encircled plus sign means "EXCLUSIVE OR" or:

$$So = A\,\bar{B}\,\overline{Ci} + \bar{A}\,B\,\overline{Ci} + A\,B\,Ci + \bar{A}\,\bar{B}\,Ci$$

Similarly, carry output output signal Co on line 14 of the full adder satisfy the following equation:

$$Co = A\,B + Ci\,(A \oplus B)$$

or:

$$Co = A\,B + Ci\,(A\,\bar{B} + \bar{A}\,B)$$

Figure 1:
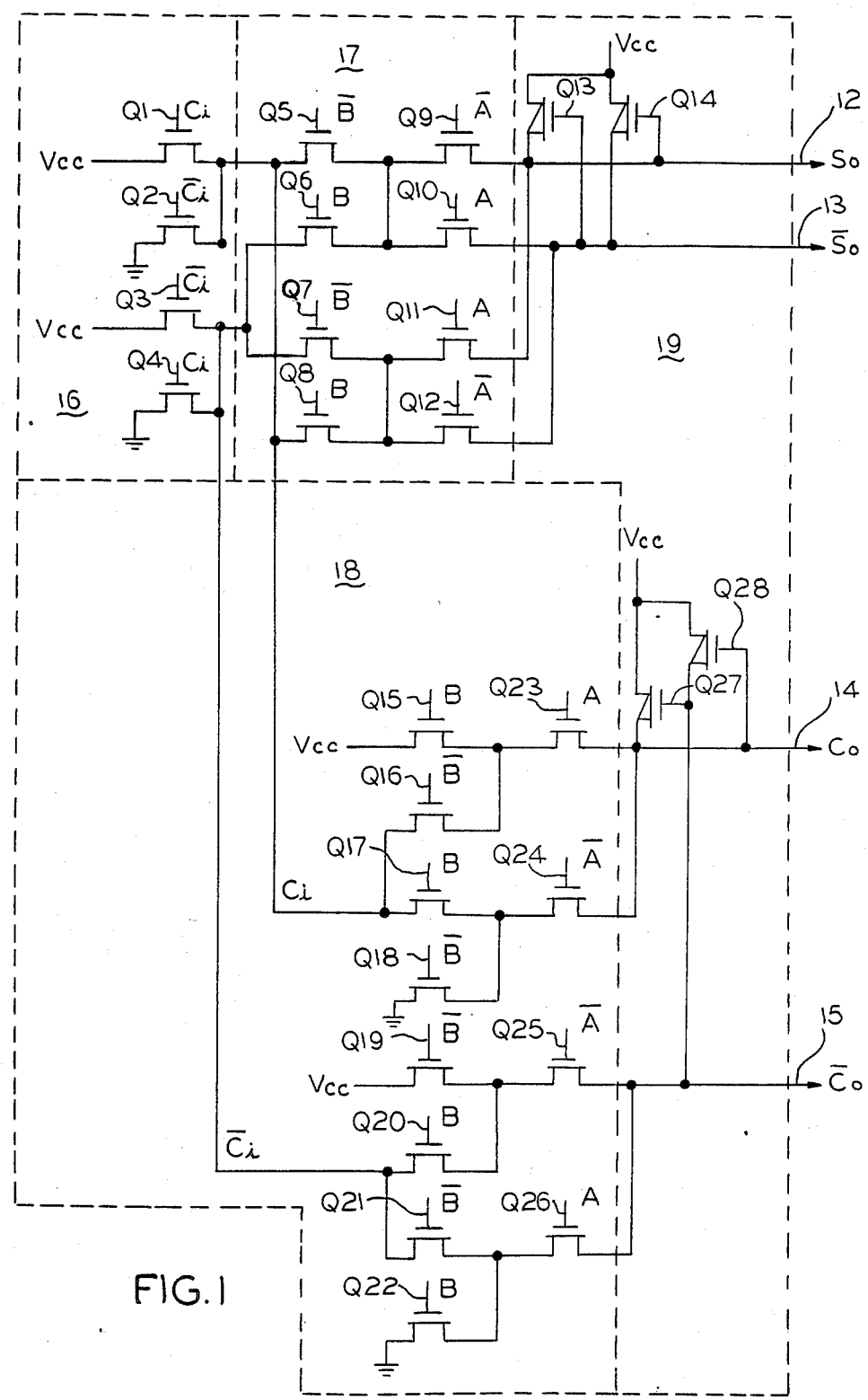
FIG. 1 is a schematic diagram showing a CMOS full adder circuit, according to the present invention.

A detailed schematic diagram of the full adder circuit of the present invention is illustrated in FIG. 1 which is embodied in balanced CMOS devices. A full adder circuit includes a carry input circuit section 16 formed of a first pair of N-channel MOS transistors Q1, Q2 and a second pair of N-channel MOS transistors Q3, Q4.

The carry input signal $\overline{C}i$ is applied to the gate to the transistor Q1 of the first pair and to the gate of the transistor Q4 of the second pair. The complement of the carry input signal $\overline{C}i$ is applied to the gate of the transistor Q2 of the first pair and to the gate of the transistor Q3 of the second pair. A supply potential $V_{CC}$ is connected to the sources of the transistors Q1 and Q3. The sources of the transistors Q2 and Q4 are tied to a ground potential.

The full adder circuit includes a sum circuit section 17 formed of a third pair of N-channel MOS transistors Q5, Q6; a fourth pair of N-channel MOS transistors Q7, Q8; a fifth pair of N-channel MOS transistors Q9, Q10; and a sixth pair of N-channel MOS transistors Q11, Q12. The augend input signal B is applied to the gates of the transistors Q6 and Q8. The complement of the augend input signal $\overline{B}$ is applied to the gates of the transistors Q5 and Q6. The sources of the transistors Q5 and Q8 are connected together and to the drains of the transistors Q1 and Q2 of the first pair of the carry input circuit section 16. The sources of the transistors Q6 and Q7 are connected together and to the drains of the transistors Q3 and Q4 of the second pair in the carry input circuit section 16. The addend input signal A is applied to the gates of the transistors Q10 and Q11. The complement of the addend input signal $\overline{A}$ is applied to the gates of the transistors Q9 and Q12. The sources of the transistors Q9 and Q10 are tied together and to the drains of the transistors Q5 and Q6. The sources of the transistors Q11 and Q12 are tied together and to the drains of the transistors Q7 and Q8.

An output circuit section 19 includes a first pair of cross-coupled P-channel MOS transistors Q13 and Q14 which have their sources connected to the supply potential $V_{CC}$. The gate of the transistor Q13 is connected to the drain of the transistor Q14, and the gate of the transistor Q14 is connected to the drain of the transistor Q13. The drain of the transistor Q13 is also connected to the drains of the transistors Q9 and Q11 and to the sum output So on the line 12. The drain of the transistor Q14 is also connected to the drains of the transistors Q10, Q12 and to the complement of the sum output $\overline{S}o$ on the line 13.

The full adder circuit further includes a carry output circuit section 18 formed of a first pair of N-channel MOS transistors Q15, Q16; a second pair of N-channel MOS transistors Q17, Q18; a third pair of N-channel MOS transistors Q19, Q20; a fourth pair of N-channel MOS transistors Q21, Q22; a fifth pair of N-channel MOS transistors Q23, Q24; and a sixth pair of N-channel MOS transistors Q25, Q26. The augend input signal B is applied to the gates of the transistors Q15, Q17, Q20 and Q22. The complement of the augend input signal $\overline{B}$ is applied to the gate of the transistors Q16, Q18, Q19 and Q21. The source of the transistors Q15 and Q19 are tied to the supply potential $V_{CC}$. The sources of the transistors Q18 and Q22 are connected to the ground potential. The sources of the transistors Q16 and Q17 are tied together and coupled to the common drains of the transistors Q1 and Q2 of the carry input circuit section 16. The sources of the transistors Q20 and Q21 are tied together and to the common drain of the transistors Q3 and Q4 of the carry input circuit section 16. The addend input signal A is applied to the gates of the transistor Q23 and Q26. The complement of the addend input signal $\overline{A}$ is applied to the gates of the transistors Q24 and Q25. The source of the transistor Q23 is connected to the drains of the transistors Q15 and Q16. The source of the transistor Q24 is connected to the drains of the transistors Q17 and Q18. The source of the transistor Q25 is connected to the drains of the transistors Q19 and Q20. The source of the transistor Q26 is connected to the drains of the transistors Q21 and Q22.

The output circuit section 19 further includes a second pair of cross-coupled P-channel MOS transistors Q27 and Q28 which have their sources connected to the supply potential $V_{CC}$. The gate of the transistor Q27 is connected to the drain of the transistor Q28 and the gate of the transistor Q28 is connected to the drain of the transistor Q27. The drain of the transistor Q27 is also connected to the drains of the transistors Q23 and Q24 and to the carry output signal Co on the line 14. The drain of the transistor Q28 is also connected to the drains of the transistors Q25, Q26 and to the complement of the carry output signal $\overline{C}o$ on the line 15.

As can be seen, the sum output So on the line 12 and the complement of the sum output $\overline{S}o$ on the line 13 are available essentially at the same time. Likewise, the carry output signal Co on the line 14 and the complement of the carry output signal $\overline{C}o$ on the line 15 are available at the same time.

Figure 2:
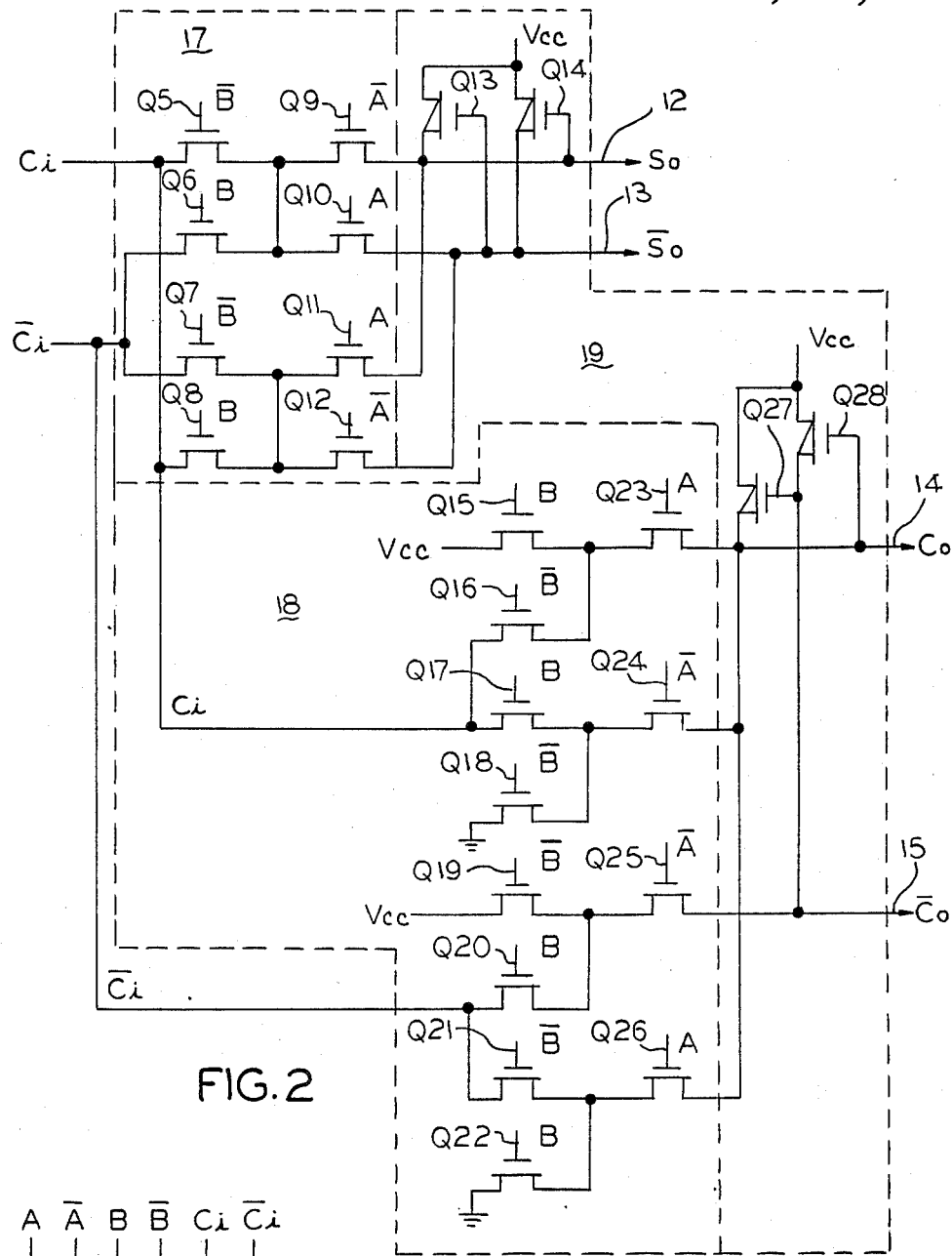
FIG. 2 is a schematic diagram showing a second embodiment of a CMOS full adder circuit, according to the present invention.

A second embodiment of a balanced CMOS full adder circuit of the present invention is illustrated in FIG. 2 which uses a lesser number of N-channel MOS transistors than that of FIG. 2. As can be seen, the reduction is due to the elimination of the first and second transistor pairs (Q1 through Q4) of the carry input circuit section 16. Thus, the carry input signal $\overline{C}i$ is applied directly to the sources of the transistors Q5 and Q17. Further, the complement of the carry input signal $\overline{C}i$ is applied directly to the sources of the transistors Q6 and Q20. Other than these changes, the circuit is identical to FIG. 2. It will be understood by those skilled in the art that this is possible only when the inputs are buffered signals. A buffered signal is defined as one in which there is a low impedance to ground in the low level state.

Thus, the full adder circuit of the present invention uses only 24 N-channel MOS transistors and 4 P-channel MOS transistors which is a significant reduction over that of a conventional CMOS design requiring 28 N-channel MOS transistors and 24 P-channel MOS transistors in order to accomplish the same performance. Accordingly, the balance CMOS full adder circuit of the present invention has advantages over the prior art which are listed as follows:

(1) it uses mostly N-channel MOS transistors which occupy less space area;
(2) it is a fully static circuit;
(3) it consumes no D.C. power;
(4) it has a high speed of operation similar to transmission gate logic circuits; and
(5) it has topological regularity which simplifies the layout on an integrated circuit substrate.

From the foregoing detail description, it can thus be seen that the present invention provides a balanced CMOS full adder circuit having a plurality of individual transistor elements which are arranged on an integrated circuit with topological regularity so as to require a lesser amount of integrated circuit surface area. Since less surface area is used, the implementation of this full adder circuit on the substrate will minimize routing of interconnecting leads, thereby improving on the speed of operation and input capacitance.

While there has been illustrated and described what are at present to be preferred embodiments of the present invention, it will be understood by those skilled in the art that various modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out this invention, but that the invention will include all embodiments falling within the scope of the appended claims.

What is claimed is:

1. A full adder circuit composed of CMOS transistors comprising:
    first input means for receiving true and complement binary addend signals;
    second input means for receiving true and complement binary augend signals;
    third input means for receiving true and complement binary carry input signals;
    first output means being coupled to said first, second and third input means for generating true and complement sum output signals, said first output means being formed of a pair of cross-coupled P-channel MOS transistors whose drains are connected to respective true and complement sum output terminals; and
    second output means being coupled to said first, second and third input means for generating true and complement carry output signals.

2. A full adder circuit as claimed in claim 1, wherein said first input means is formed of a plurality of N-channel MOS transistors.

3. A full adder circuit as claimed in claim 2, wherein said second input means is formed of a plurality of N-channel MOS transistors.

4. A full adder circuit as claimed in claim 3, wherein said third input means is formed of a plurality of N-channel MOS transistors.

5. A full adder circuit as claimed in claim 1, wherein said true and complement sum output signals are generated at respective true and complement sum output terminals at the same time.

6. A full adder circuit as claimed in claim 5, wherein said second output means is formed of a pair of cross-coupled P-channel MOS transistors whose drains are connected to respective true and complement carry output terminals.

7. A full adder circuit as claimed in claim 6, wherein said true and complement carry output signals are generated at the respective true and complement carry output terminals at the same time.

8. A full adder circuit as claimed in claim 1, wherein said first, second and third input means are formed of MOS transistors of one conductivity.

9. A full adder circuit as claimed in claim 8, wherein said first and second output means are formed of MOS transistors of a complementary type.

10. A full adder circuit as claimed in claim 9, wherein all of said transistors are arranged on an integrated circuit substrate with topological regularity.

11. A balanced CMOS full adder circuit comprising:
    a sum circuit section including:
        a plurality of N-channel MOS transistors having their gates adapted to receive true and complement binary addend signals;
        a plurality of N-channel MOS transistors having their gates adapted to receive true and complement binary augend signals;
    a carry output circuit section including:
        a plurality of N-channel MOS transistors having their gates adapted to receive true and complement binary addend signals; and
        a plurality of N-channel MOS transistors having their gates adapted to receive true and complement augend signals;
    a carry input circuit section including:
        a plurality of N-channel MOS transistors having their gates adapted to receive true and complement carry input signals;
    an output circuit section including:
        a first pair of cross-coupled P-channel MOS transistors connected to said sum circuit section and having their drains connected to respective true and complement sum output terminals; and
        a second pair of cross-coupled P-channel MOS transistors connected to said carry out circuit section and having their drains connected to respective true and complement carry output terminals.

12. A full adder circuit as claimed in claim 11, wherein true and complement sum output signals are generated at the respective true and complement sum output terminals at the same time.

13. A full adder circuit as claimed in claim 12, wherein true and complement carry output signals are generated at the respective carry output terminals at the same time.

14. A full adder circuit as claimed in claim 11, wherein all of said transistors are arranged on an integrated substrate with topological regularity.

* * * * *